Dec. 2, 1958 B. F. ACKERMAN ET AL 2,863,051
ELECTRONIC SWITCH
Filed July 14, 1954
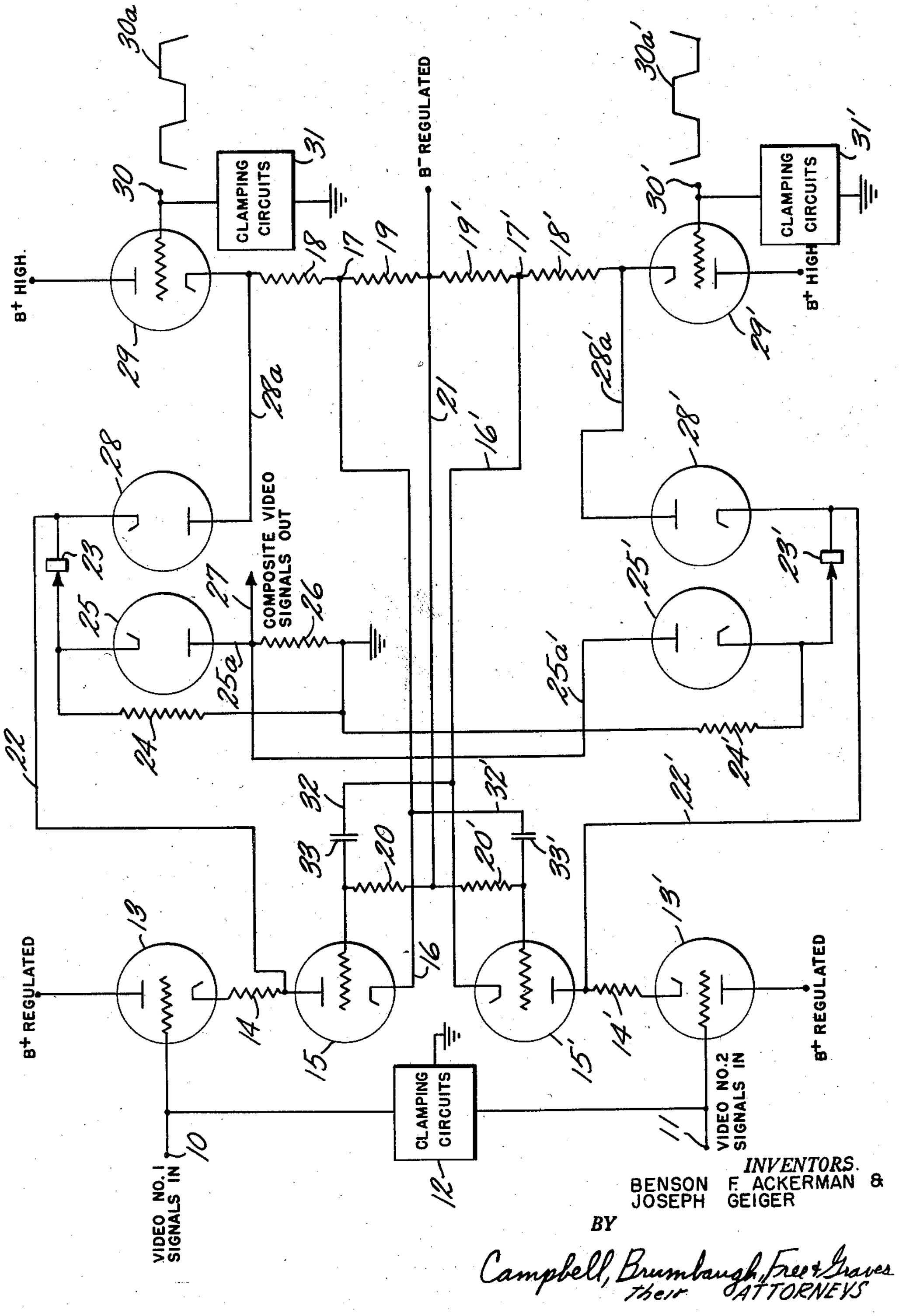
INVENTORS.
BENSON F. ACKERMAN &
JOSEPH GEIGER
BY
Campbell, Brumbaugh, Free & Graves
their ATTORNEYS United States Patent Office 2,863,051

Patented Dec. 2, 1958

2,863,051

ELECTRONIC SWITCH

Benson F. Ackerman, Leonia, N. J., and Joseph Geiger, Levittown, N. Y., assignors to Columbia Broadcasting System, Inc., New York, N. Y., a corporation of New York Application July 14, 1954, Serial No. 443,392

16 Claims. (Cl. 250—27)

This invention relates to an electronic switch and has particular reference to apparatus for switching between two video signals in accordance with keying signals.

The necessity for switching between a pair of video signals is widespread in present television programming. For example, various types of wipes, montages, and keyed insertions require such switching. Previous equipment performing this function has suffered from both complexity and an inability to provide clean switching without superimposing the switching signals on the video signals.

Accordingly, it is an object of the present invention to provide electronic switching apparatus overcoming the above-mentioned defects.

It is another object of the invention to provide for switching video signals in accordance with keying signals.

It is yet another object of the present invention to provide for switching first video signals off and second video signals on in accordance with keying signals, the two first switching actions being interrelated.

These and further objects of the present invention are accomplished by supplying video signals to an output circuit through unidirectional conducting means and varying the potential at the junction of the unidirectional conducting means remote from the output circuit in accordance with the switching signals.

In a preferred embodiment of the invention, two video signals are supplied to the output circuit through two channels each being similar to that described above. The switching signals are applied 180 degrees out of phase to the channels to cause one to switch off when the other switches on. In addition, the keying signals being supplied to switch one of the video signals are employed to modulate the switching of the other video signals to reduce the switching voltage appearing in the composite output of the switch.

These and further objects and advantages of the invention will be more readily understood when the following description is read in connection with the accompanying drawing in which the single figure is a schematic circuit diagram illustrating a typical embodiment of the present invention.

Referring to the illustrative embodiment of the invention shown in the figure in greater detail, a pair of terminals 10 and 11 are adapted to receive two video signals it is desirable to switch in accordance with keying signals. Since the electronic switch is constructed with two substantially identical back to back circuits and each of the video signals follows a similar path, only the circuit elements controlling the video No. 1 signals will be described in detail. It will, of course, be understood that similar operations will be performed upon the video signals supplied to the terminal 11.

The D.-C. level of video No. 1 signals supplied to the terminal 10 is fixed by the clamping circuits 12 which may also include circuits to adjust the D.-C. balance between video No. 2 signals applied to the terminal 11 and the video No. 1 signals. A conventional triode 13 has its plate connected to a regulated B+ supply, its grid tied to the terminal 10, and its cathode joined to a load resistor 14 connected at its lower end to the plate of another triode 15. The cathode of the triode 15 is coupled by a conductor 16 to the junction point 17 of a pair of resistors 18 and 19. In addition, the grid of the triode 15 is coupled through a resistor 20 and a conductor 21 to a regulated B— supply and to the lower end of the resistor 19.

A conductor 22 leads from the plate of the triode 15 to a rectifying crystal 23, such as a germanium diode, which is coupled through a resistor 24 to ground. Further, the crystal 23 is joined to the cathode of a diode 25 having its plate coupled through a conductor **25*a* and a load impedance 26, preferably a resistor as shown, to ground, the video output signals appearing on a cable 27 leading from the conductor 25*a***.

The conductor 22 is also connected to the cathode of another diode 28 having its plate tied by a conductor **28*a* to the cathode of a triode 29 which is joined to the upper end of the resistor 18. The plate of the triode 29 is joined to a high B+ supply that is of a substantially greater voltage than that appearing at the plate of the triode 13. The grid of the triode 29 is connected to a terminal 30 to which are supplied keying signals 30*a* for switching the video signals. Clamping circuits 31 are connected between the terminal 30** and ground in order to fix the D.-C. level of such keying signals.

The channel receiving the video No. 1 signals at the terminal 10 will be referred to hereinafter as the upper channel and the channel receiving the video No. 2 signals at the terminal 11 will be referred to as the lower channel. Preferably, the lower channel is substantially identical to the upper channel so that corresponding elements therein will be designated by primed reference numerals and will not be described in detail.

At this time, it will be helpful to examine the nature and relation of the keying signals **30*a* and 30*a*'. These signals are preferably derived from a single signal in the form of a series of positive and negative going substantially rectangular pulses with slightly sloping sides. The slope of the sides of the keying signals 30*a* and 30*a*' has been somewhat exaggerated in the drawing for clarity. Suitable circuitry is utilized to produce the keying signals 30*a* and 30*a*' substantially 180 degrees out of phase. Thus, when a positive going pulse is applied to the terminal 30, a similar negative going pulse will be applied to the terminal 30'. However, due to the inherent errors found in any phase splitting circuit resulting from imperfectly balanced tubes, circuit elements, etc., the pulses applied to the terminals 30 and 31'** may be slightly displaced from each other along the time axis. In this event, the on and off switching functions of the upper and lower channels as they are unblocked and blocked by the keying signals would not coincide unless the circuit means described in detail below were employed.

In describing the operation of the switch, it will be assumed that the upper channel is on or unblocked and the lower channel off or blocked so that the video No. 1 signals supplied to the terminal 10 will appear at the conductor 27. At this time, the triode 29 is relatively non-conducting since a relatively negative portion of the keying signals **30*a* is being applied to the grid thereof through the terminal 30. In addition, the triode 29' is relatively conducting since a relatively positive portion of the keying signals 30*a*' is being applied to the grid thereof through the terminal 30'. Accordingly, the cathode of the triode 29 and the junction point 17 will be at relatively high negative potentials and conduction of the diode 28, which may be referred to as a latching diode, will be precluded. Therefore, a fixed negative potential will be found at the plate of the triode 15, which is biased to be conductive, and at the cathode of the triode 13. Such fixed negative potential is chosen, of course, to permit conduction of the triode 13**.

Due to the negative potential found at the plate of the triode 15, there will be a current flow from ground through the resistor 26, the diode 25, the crystal 23 and the conductor 22 to the triode 15. Thus, the video signals appearing at the grid of the triode 13 will also appear across the resistor 26 and at the output conductor 27.

With respect to the lower channel, the cathode of the triode 29' will be relatively positive causing conduction of the diode 28', which may be termed the latching action of the diode 28', through the conductors **28*a'* and 22', the triode 15' and the conductor 16' to the junction 17'. Therefore, the crystal 23' and the diode 25'** will be non-conducting, the off condition of the switch, since their cathodes are at a higher potential than their anodes.

With the switch in the above-described condition, a positive portion of the keying signals **30*a* may appear at the terminal 30 prior to a negative portion of the signals 30*a'* at the terminal 30'** or vice versa. Obviously, they may appear at exactly the same time in which event certain problems would not arise. However, this condition is unlikely to occur in a significant number of switching cycles.

Assuming that the positive portion of the keying signals **30*a* appears at the terminal 30 prior to the negative portion of the keying signals 30*a'* at the terminal 30', the triode 29 will become relatively more conductive and the cathode potential thereof will be raised sufficiently to eventually cause the diode 28 to become conductive. This is referred to as the latching action of the diode 28, as described above, since it joins the cathode of the triode 29 to the anode of the triode 15**.

However, before further consideration is given to the function of the diode 28, it is necessary to examine the switching operations occurring prior to the above mentioned latching operation. Due to the increased current flow through the triode 29, the junction 17 will go in a positive direction resulting in an increase in potential at the cathode of the triode 15 through the conductor 16. It will be evident that such bias renders the triode 15 less conductive. Accordingly, the plate of the triode 15 will be positive going resulting in a decrease in the potential across the crystal 23 and the diode 25.

It will be remembered that the positive portion of the keying signals **30*a* being applied to the terminal 30 leads the negative portion of the keying signals 30*a'* being applied to the terminal 30'. This positive going pulse will be coupled through the conductor 16 and a conductor 32' to a differentiating network consisting of a condenser 33' and the resistor 20'**.

To understand the function served by the above-mentioned differentiating network, the action of the negative going pulse applied to the terminal 30' should be understood. The triode 29' will be rendered less conductive causing its cathode and the junction 17' to swing in a negative direction to unlatch the diode 28' since the plate will be driven to a lower potential than the cathode thereof.

In addition, the cathode of the triode 15' becomes more negative due to its connection to the junction 17' by the conductor 16'. Thus, the triode 15' will be rendered more conductive. This causes the plate of the triode 15' to go in a negative direction. Until the diode 28' becomes non-conductive, it is obvious that the plate of the triode 15' will be driven negative by the cathode of the triode 29'. It is apparent that this action will eventually result in the conduction of the crystal 23' and the triode 25' to couple the video No. 2 signals through the conductor **25*a'* to the load resistor 26**.

The utilization of the latching diode 28' serves in the above operation to prevent the keying signals **30*a'* from appearing in the video No. 2 signals. Thus, when the video signals are coupled through the crystal 23' and the diode 25' to the load 26, the diode 28' acts essentially as an open circuit with respect to the keying signals 30*a'***.

Returning now to the differentiating circuit formed by the condenser 33' and the resistor 20', the positive pulse generated thereacross as a result of the pulse at the junction 17 will be effectively added to the negative pulse at the junction 17', since the positive differentiating pulse is applied to the grid and the negative pulse to the cathode of the tube 15'. Thus, the increased conduction of the triode 15' will be a function of both the keying signals **30*a'* and the keying signals 30*a***.

It will be apparent that the increased current flow through the triode 15' will accelerate the going on action or unblocking of the lower channel by increasing the rate at which the plate thereof is moving in a negative direction. This phenomenon tends to hang the upper and lower channels together by compensating for the lagging negative portion of the keying signals **30*a'***.

By providing a common load 26, further advantages are obtained in the operation of this switch. The decrease in potential across the load resistor 26 due to the increase in potential at the plate of the triode 15 results in a further acceleration of the on switching function of the lower channel. Thus, as the potential at the plate of the diode 25' becomes less negative, the voltage drop across the diode 25' and the crystal 23' increases which has the effect of decreasing the time it will take for these elements to become conductive.

Assuming next that the negative portion of the keying signals **30*a'* leads the positive portion of the keying signals 30*a*, the negative pulse at the junction 17' will be applied through the conductor 16' to the differentiating circuit including the condenser 33 and the resistor 20. The resulting negative pulse on the grid of the triode 15 will be added to the positive pulse on the cathode thereof, resulting from the increase in potential at the junction 17, to render the triode 15 relatively less conductive. This will accelerate the off going function or blocking of the upper channel by increasing the rate at which the plate of the triode 15 goes positive. In addition, conduction through the diode 25' and crystal 23' increases the potential drop across the load 26 to accelerate the cut-off of the diode 25 and crystal 23. Further, the delay in the operation of the upper channel due to the lagging positive portion of the keying signals 30*a* will exert a decelerating influence on the operation of the lower channel by the failure to furnish an early positive differentiated pulse to the triode 15' and an early decrease in potential at the plate of the diode 25'**.

In connection with the instance where the positive portion of the keying signals **30*a* leads the negative portion of the keying signals 30*a'*, it will be evident that the lag in applying the differentiated negative pulse to the triode 15 will have the effect of decelerating the off action of the upper channel. Also, the failure to furnish an increased potential drop across the load 26 due to conduction through the diode 25' and the crystal 23'** will also have the effect of decelerating the switching off of the upper channel.

Accordingly, it will be evident that the cross coupling of the upper and lower channels serves to cause the simultaneous off and on switching functions to hang closely together.

Returning to the latching action of the diode 28, as soon as the cathode of the triode 29 is raised slightly above the potential of the anode of the triode 15, the diode 28 will conduct current through the conductors **28*a*** and 22, the triode 15, and the conductor 16. This will drive the terminal of the crystal 23 tied to the diode 28 in a positive direction, in accordance with the increase in potential at the cathode of the triode 29, to switch off the upper channel. The rise in potential at the plate of the triode 15 will also cut off conduction through the tube 13. However, it will be understood that this action is not essential since the video signals are effectively blocked by the crystal 23 and the diode 25.

The switching action through the latching diode 28 occurs rapidly in comparison with the initial switching action. It will be evident that due to the preliminary switching and the rapid switching through the latching diodes 28 and 28′, little or none of the keying signals 30*a* and 30*a*′ will appear in the composite video signals appearing across the load 26.

Accordingly, it will be evident that an electronic switch serving to provide composite video signals from a pair of video input signals in response to keying signals has been provided. Further, since the switch is D.-C. coupled, D.-C. restoration problems will not be encountered. In a typical embodiment of the invention, video signals up to 10 megacycles may be switched.

It will be understood that the above-described embodiments of the invention are illustrative only and modifications thereof will occur to those skilled in the art. For example, an input circuit operating in a manner similar to the cathode follower could be employed. Also, it will be apparent that a single diode 25 or crystal 23 may be employed to accomplish the function performed by both of these elements. However, it has been found that the series connected combination of the crystal 23 such as a germanium diode and the diode 25, together with a high resistance 24 connected across the diode 25, provides a more desirable cut-off characteristic for use in switching video signals in television programming. In addition, the polarity of the undirectional coupling means including the crystal 23 and diode 25 could be reversed if the remaining circuits including the diode 28 were revised in accordance with conventional practice. Further, more than two channels may supply video signals alternately to the load 26, appropriate channels being related to switch in sequence. Therefore, the invention is not to be limited to the specific apparatus disclosed herein but is to be defined by the appended claims.

We claim:

1. An electronic switch comprising a first junction adapted to be coupled to a source of signals, means including first unidirectional conducting means and a load impedance for coupling said first junction to a reference potential, a second junction adapted to be coupled to a source of keying signals, means including second unidirectional conducting means for coupling said first junction to said second junction, means including an electron tube for varying the potential of said first junction, and means to couple the second junction to the input circuit of the electron tube to vary its conductivity in accordance with the potential of said second junction.

2. An electronic switch comprising a first junction adapted to be coupled to a source of signals, means including first unidirectional conducting means for coupling said first junction to a load impedance connected to a first reference potential, a second junction adapted to vary in potential in accordance with keying signals, second unidirectional conducting means for coupling said first junction to said second junction, circuit means including an electron tube having at least an anode, a cathode and a grid for coupling said first junction to a second reference potential, means to direct current couple said anode to said first junction, and means for applying a voltage proportional to the potential at said second junction between the grid and cathode of said electron tube to vary its conductivity in accordance with the potential of said second junction.

3. An electronic switch comprising a first junction adapted to be coupled to a source of signals, means including a crystal rectifier series connected with a diode for coupling said first junction to an impedance connected to a first reference potential, a resistor connected in parallel with said diode and said impedance, a second junction adapted to vary in potential in accordance with keying signals, second unidirectional conducting means for coupling said first junction to said second junction, circuit means including an electron tube having at least an anode, a cathode and a grid of coupling said first junction to a second reference potential, said anode being connected to said first junction, and means for applying a voltage proportional to the potential at said second junction between the grid and cathode of said electron tube.

4. An electronic switch comprising a first cathode follower electron tube circuit having a resistor in the cathode circuit, said first cathode follower adapted to have its input coupled to a source of video signals, first unidirectional conducting means forming a first junction with the end of the cathode resistor remote from the cathode follower, said first unidirectional conducting means coupling said first junction to a load impedance connected to a first reference potential, a second cathode follower electron tube circuit having its cathode coupled through resistance means to a second reference potential, said second cathode follower adapted to have its input coupled to a source of keying signals, second unidirectional conducting means forming a second junction with the cathode of said second cathode follower, said second unidirectional conducting means coupling said first junction to said second junction, means including an electron tube having at least an anode, a cathode and a grid for coupling said first junction to said second reference potential, said anode being connected to said first junction, and means for applying a voltage proportional to the potential at the cathode of said second cathode follower between the grid and cathode of said electron tube.

5. Apparatus as defined in claim 4 wherein said first unidirectional conducting means comprises a series connected crystal and diode, and a resistor connected in parallel with said diode and said load impedance.

6. An electronic switch comprising first and second junctions adapted to be coupled to first and second sources of signals, respectively, means including first unidirectional conducting means for coupling said first junction to a load impedance connected to a reference potential, means including second unidirectional conducting means for direct current coupling said second junction to said impedance, first and second circuit means responsive to first keying signals for independently varying the potential of said first junction, third and fourth circuit means responsive to second keying signals for varying the potential of said second junction, said second circuit means being at least partially controlled by said third circuit means and said fourth circuit means being at least partially controlled by said first circuit means so that one of the first and second signals is removed from the load impedance as the other of said first and second signals is applied to the load impedance.

7. An electronic switch comprising first and second junctions adapted to be coupled to first and second sources of signals, respectively, means including first unidirectional conducting means for coupling said first junction to a load impedance connected to a reference potential, means including second unidirectional conducting means for coupling said second junction to said impedance, first circuit means including third unidirectional conducting means responsive to first keying signals for varying the potential of said first junction, second circuit means responsive to the first keying signals for varying the potential of said first junction, third circuit means including fourth unidirectional conducting means responsive to second keying signals for varying the potential of said second junction, fourth circuit means responsive to the second keying signals for varying the potential of said second junction, means coupling said second and fourth circuit means so that said second circuit means is at least partially controlled by said fourth circuit means, and means coupling said fourth and second circuit means so that said fourth circuit means is at least partially controlled by said second circuit means.

8. An electronic switch comprising first and second junctions adapted to be coupled to first and second sources of signals, respectively, means including first unidirectional conducting means for coupling said first junction to an impedance connected to a reference potential, means including second unidirectional conducting means for coupling said second junction to said impedance, third and fourth junctions adapted to be coupled to first and second keying signals, respectively, said first and second keying signals being substantially identical and substantially 180 degrees out of phase, first circuit means including third unidirectional conducting means for coupling said third junction to said first junction, second circuit means responsive to said first keying signals for varying the potential of said first junction in accordance with said first keying signals, said second circuit means also being operative in response to a third signal which is a function of said second keying signals, third circuit means including fourth unidirectional conducting means for coupling said fourth junction to said second junction, and fourth circuit means responsive to said first keying signals for varying the potential of said second junction in accordance with said second keying signals, said fourth circuit means also being operative in response to a fourth signal which is a function of said first keying signals.

9. Apparatus as defined in claim 8 wherein the third and fourth signals comprise the derivatives of the second and first keying signals, respectively.

10. An electronic switch comprising first and second junctions adapted to be coupled to first and second sources of signals, respectively, means including first unidirectional conducting means for coupling said first junction to an impedance connected to a reference potential, means including second unidirectional conducting means for coupling said second junction to said impedance, third and fourth junctions adapted to be coupled to first and second keying signals, respectively, said first and second keying signals being substantially identical and substantially 180 degrees out of phase, first circuit means including third unidirectional conducting means for coupling said third junction to said first junction, second circuit means including a first electron tube having at least an anode, a cathode and a grid for coupling said first junction to a second reference potential, said anode being connected to said first junction, means for applying a voltage proportional to the potential at said third junction between the grid and cathode of said first tube, first differentiating means responsive to said second keying signals for applying a voltage between the grid and cathode of said first tube, third circuit means including fourth unidirectional conducting means for coupling said fourth junction to said second junction, fourth circuit means including a second electron tube having at least an anode, a cathode and a gird for coupling said second junction to the second reference potential, said anode of said second tube being connected to said second junction, means for applying a voltage proportional to the potential at said fourth junction between the grid and cathode of said second tube, and second differentiating means responsive to said first keying signals for applying a voltage between the grid and cathode of said second tube.

11. An electronic switch comprising first and second cathode follower electron tube circuits having first and second resistors in the cathode circuit, respectively, said first and second cathode followers adapted to have their inputs coupled to first and second sources of video signals, respectively, first unidirectional conducting means forming a first junction with the end of the first cathode resistor remote from the first cathode follower, said first unidirectional conducting means coupling said first junction to a load impedance connected to a first reference potential, second unidirectional conducting means forming a second junction with the end of the second cathode resistor remote from the second cathode follower, said second unidirectional conducting means coupling said second junction to said load impedance, third and fourth cathode follower electron tube circuits having their cathodes coupled through first and second resistance means, respectively, to a second reference potential, said third and fourth cathode followers adapted to have their inputs coupled to first and second sources of keying signals, respectively, said first and second keying signals being substantially identical and substantially 180 degrees out of phase, third unidirectional conducting means forming a third junction with the cathode of said third cathode follower, said third unidirectional conducting means coupling said first junction to said third junction, means including an electron tube having at least an anode, a cathode and a grid for coupling said first junction to said second reference potential, said anode being connected to said first junction, means for appling a voltage proportional to the potential at the cathode of said third cathode follower between the grid and cathode of said first electron tube, first differentiating means responsive to said second keying signals for applying a voltage between the grid and cathode of said first electron tube, fourth unidirectional conducting means forming a fourth junction with the cathode of said fourth cathode follower, said fourth unidirectional conducting means coupling said second junction to said fourth junction, means including a second electron tube having at least an anode, a cathode and a grid for coupling said second junction to said second reference potential, said anode of said second tube being connected to said second junction, means for applying a voltage proportional to the potential at the cathode of said fourth cathode follower between the grid and cathode of said second electron tube, and second differentiating means responsive to said first keying signals for applying a voltage between the grid and cathode of said second tube.

12. Apparatus as defined in claim 11 wherein said first and third unidirectional conducting means each comprise a series connected crystal and diode, and a resistor connected in parallel with said diode and said load impedance.

13. Apparatus for switching first signals off and second signals on simultaneously comprising two signal channels alternately coupling signals to a load impedance in accordance with keying signals, unidirectional conducting means in each channel responsive to the keying signals to block and unblock its associated channel, said keying signals being furnished to each channel substantially 180 degrees out of phase to block one channel and unblock the other channel simultaneously, and circuit means coupling the two channels and responsive to said keying signals to accelerate one of the blocking and unblocking actions of the two channels to synchronize the switching action of the channels.

14. Apparatus as defined in claim 13, wherein the circuit means includes a differentiating circuit associated with each channel, the differentiating circuit associated with one channel being responsive to keying signals applied to the other channel to accelerate the blocking and unblocking of the one channel.

15. Apparatus for switching first signals off and second signals on simultaneously comprising two signals channels alternately coupling the first and second signals to a load impedance in accordance with keying signals, unidirectional conducting means in each channel responsive to the keying signals to block and unblock its associated channel, said keying signals being furnished to each channel substantially 180 degrees out of phase to block one channel and unblock the other channel simultaneously, circuit means cross coupling the two channels, said circuit means being responsive to said keying signals to accelerate one of the blocking and unblocking actions of the two channels to synchronize the switching action of the channels.

16. Apparatus as defined in claim 13, wherein the circuit means includes a differentiating circuit associated with each channel, the differentiating circuit associated with one channel being responsive to keying signals applied to the other channel to accelerate the blocking and unblocking of the one channel.

References Cited in the file of this patent

UNITED STATES PATENTS

| | | |
|---|---|---|
| 2,399,473 | Desch et al. | Apr. 30, 1946 |
| 2,513,910 | Bliss | July 4, 1950 |
| 2,570,225 | Felker | Oct. 9, 1951 |
| 2,583,146 | Jacob | Jan. 22, 1952 |
| 2,773,982 | Trousdale | Dec. 11, 1956 |

OTHER REFERENCES

Waveforms, Radiation Lab. Series, vol. 19, 1949, 1st edition, by Chance et al., pages 370 to 371, published by McGraw-Hill Book Co., Inc., New York.